US006758393B1

(12) United States Patent
Luciano et al.

(10) Patent No.: US 6,758,393 B1
(45) Date of Patent: Jul. 6, 2004

(54) MOBILE CASHIER TERMINAL

(75) Inventors: Robert A. Luciano, Reno, NV (US);
Warren R. White, Reno, NV (US);
Russ T. Bradford, Incline, NV (US)

(73) Assignee: Sierra Design Group, Reno, NV (US)

( * ) Notice: Subject to any disclaimer, the term of this patent is extended or adjusted under 35 U.S.C. 154(b) by 121 days.

(21) Appl. No.: 09/659,766

(22) Filed: Sep. 11, 2000

Related U.S. Application Data

(63) Continuation-in-part of application No. 09/420,221, filed on Oct. 16, 1999, now Pat. No. 6,500,067.
(60) Provisional application No. 60/153,195, filed on Sep. 10, 1999.

(51) Int. Cl.[7] .................................................. G06F 17/60
(52) U.S. Cl. .......................... 235/379; 902/22; 902/23; 705/16; 463/25
(58) Field of Search ................................ 235/379, 380, 235/381, 487, 494, 383, 375, 385, 462.01, 1.13, 462.45, 472.01, 472.02; 902/22, 23; 705/16, 17, 21, 24, 39, 44; 463/25, 17, 29, 1; 280/33.998; 340/10.32, 5.4, 5.41, 5.42, 286.01; 194/217

(56) References Cited

U.S. PATENT DOCUMENTS

| 4,673,932 | A | * | 6/1987 | Ekchian et al. .......... 340/10.32 |
| 5,290,033 | A | * | 3/1994 | Bittner et al. ................. 463/25 |
| 5,334,821 | A | * | 8/1994 | Campo et al. ............... 235/380 |
| 5,371,348 | A | * | 12/1994 | Kumar et al. .......... 235/472.02 |
| 5,412,193 | A | * | 5/1995 | Swartz et al. ................ 235/383 |
| 5,489,773 | A | * | 2/1996 | Kumar ........................ 235/380 |
| 5,584,362 | A | * | 12/1996 | Dumont .................. 235/383 X |
| 5,785,328 | A | * | 7/1998 | Eckloff .................. 280/33.998 |
| 5,919,091 | A | * | 7/1999 | Bell et al. ..................... 463/25 |
| 5,941,771 | A | * | 8/1999 | Haste, III .................... 463/17 |
| 5,949,042 | A | * | 9/1999 | Dietz, II et al. ............. 235/375 |
| 6,110,044 | A | * | 8/2000 | Stern ............................ 463/29 |
| 6,227,972 | B1 | * | 5/2001 | Walker et al. ................ 463/25 |
| 6,280,326 | B1 | * | 8/2001 | Saunders ..................... 463/25 |
| 6,296,101 | B1 | * | 10/2001 | Hasegawa et al. .......... 194/217 |
| 6,328,149 | B1 | * | 12/2001 | Blad et al. ................... 194/217 |
| 6,340,331 | B1 | * | 1/2002 | Saunders et al. ............. 463/25 |
| 6,435,407 | B1 | * | 8/2002 | Fiordelisi ..................... 235/383 |
| 6,500,067 | B1 | * | 12/2002 | Luciano et al. ............... 463/25 |
| 2001/0034266 | A1 | * | 10/2001 | Saunders ..................... 463/25 |

FOREIGN PATENT DOCUMENTS

| DE | 4344973 A1 | * | 5/1995 |
| WO | WO 02/32520 A1 | * | 4/2002 |

* cited by examiner

Primary Examiner—Jared J. Fureman
(74) Attorney, Agent, or Firm—Ryan A. Heck; Ian F. Burns & Associates

(57) ABSTRACT

The present specification discloses a mobile cashier terminal adaptable for use with cash or cashless voucher gaming system having a LAN interconnecting cashier terminals, a central voucher-record database server, one or more logical gaming controllers, and a plurality of player terminals in order to play games of chance at each player terminal. The system provides voucher printers at the cashier terminal and preferably at the player terminals as well. The vouchers include unique bar codes printed on the vouchers, and the bar codes are readable by scanners at the cashier terminal and at the player terminals. The player terminals are preferably adapted to provide the player with the option of receiving at least certain amounts of cash rather than a voucher, but to also ensure that at least a voucher is provided to the player in the event that the player terminal fails to dispense cash when earned by the player and payable to the player under the game rules at the player terminal.

19 Claims, 16 Drawing Sheets

Microfiche Appendix Included
(3 Microfiche, 161 Pages)

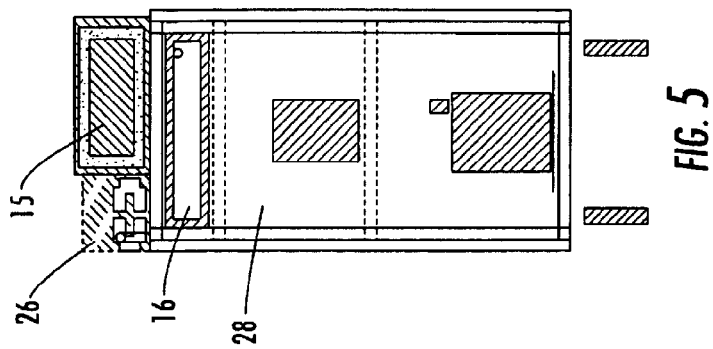
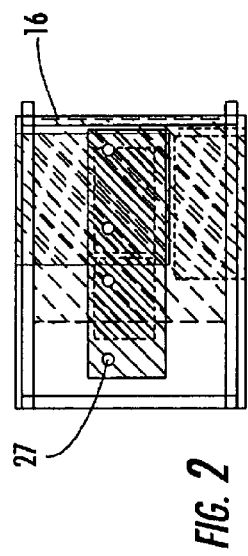
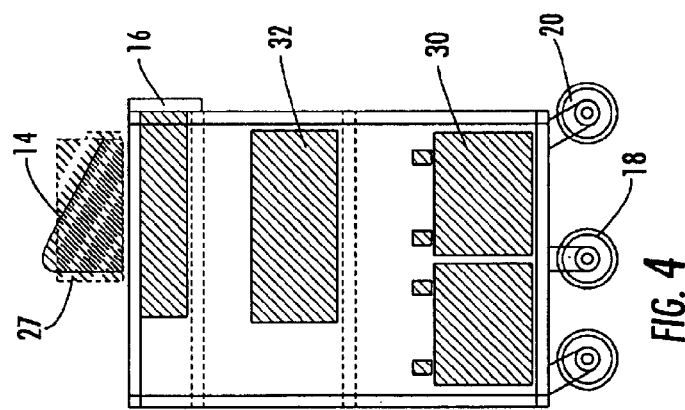
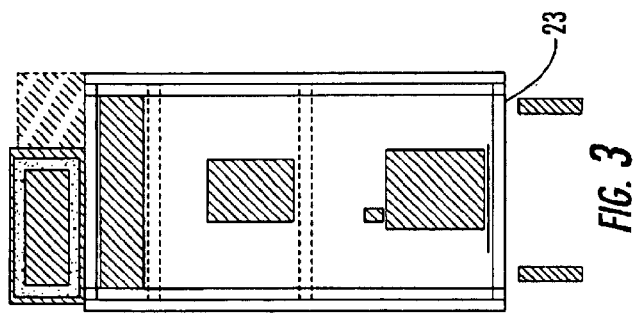

MOBILE CASHIER TERMINAL

RELATED APPLICATIONS

This application is a continuation-in-part application of the pending patent application entitled "Voucher Gaming System", application Ser. No. 09/420,221, filed Oct. 16, 1999, now U.S. Pat. No. 6,500,067, and claims priority of U.S. provisional patent application Serial No. 60/153,195, filed on Sep. 10, 1999.

REFERENCE TO MICROFICHE APPENDIX

This application includes Appendix A (3 fiches; 161 frames) that is submitted in microfiche form.

NOTICE OF COPYRIGHT OWNERSHIP portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of Invention

The present invention relates to cashier terminals and a method of using the same. In particular, it relates to a mobile cashier terminal adapted for use with gaming machines employing vouchers, tickets, cash and the like.

2. Description of Related Art

Various cashier terminals are known. They are adapted as bank terminals provide customer access to cash and credit transactions, as telephone pre-paid card dispensers, and other token merchandise dispensers. The present invention provides a unique, mobile cashier terminal particularly adapted for the needs of the gaming industry where large banks of gaming machines on a casino floor require localized dispensers of cash and vouchers for play, as well as redemption of winning tickets. The invention thus facilitates cash and credit exchange services directly from the casino floor as well as the generation and cashing of a variety of vouchers having bar code indicia, as well as visually readable indicia.

The mobile cashier terminal is particularly adapted for use with applicants' co-pending Voucher Gaming System, Ser. No. 09/420,221, filed on Oct. 16, 1999, to process information contained on these bar code vouchers and interact with a centralized data processing center. This voucher gaming system invention addresses Casinos' need for cashless transaction systems for their games of chance. The applicant has discovered that, however, gaming players often desire a simple, familiar method of transferring funds in and out of gaming devices without inserting or withdrawing cash at the gaming devices themselves.

Although other prior art systems also have provided the player with the ability to transfer funds from device to device via a printed voucher, they often have required cash funds to be inserted into the gaming devices to initiate game credit deposits. This is unworkable in certain jurisdictions as well as less than optimal for players who prefer not to deal with insertion of funds at the games themselves.

Another problem is that the prior art voucher systems are usually inflexible. For example, they typically do not provide for games of chance in the system to provide awards in one kind (such as by cash or by a particular product) as well as by credit to the player through the voucher system (Bittner). This deprives the casino using such systems of the ability to generate excitement in the gaming environment, and thus stimulate the desire to engage in further play of the games, by, for example, dispensing actual cash at the games or by providing awards of particular products to the game player.

The interactive mobile cashier terminal (MCT) described below is readily adapted for use with voucher gaming systems, which tracks and confirms the authenticity of the vouchers, collects valuable player information, and can be used to provide more efficient gaming services. The mobile cashier terminal is integral to applicant's method and apparatus that can be, but need not necessarily be, cashless and does not require the player to insert cash at the gaming device itself. The method and apparatus prints a unique voucher from one of several different types of terminals on a gaming device network. The cash voucher is accepted by the networked gaming devices (player terminals or PTs) in order to play the games on those networked devices (preferably games of chance). The method and apparatus allows for the issuance of a voucher from a cashier terminal operated by a cashier (CT), a mobile cashier terminal (MCT), an automated cash exchange terminal (CET), or from a player terminal (PT).

When a voucher is issued a record of the voucher and its corresponding value is recorded on a database in a separate computer called a player account server (PAS). The voucher may be redeemed for value at a CT or MCT. The voucher may also be used to enable the transfer of credits from the database to a PT, so that a player may elect to play at a different gaming device by generating a voucher on one PT and inserting it into another, without use of cash.

Since the voucher identifies an item in the database the method can also be used, if desired by the casino, for the disbursement of non-cash prizes, such as merchandise or other items of value at the CT or MCT or through a networked point of sale system.

As noted above, each voucher shall have a unique and secure identification indicia printed on it in a machine-readable code, preferably in a bar code. The identification can be issued by a random number generator or by a combination of the casino identification number, machine number, sequential number or other number wholly or partially encoded onto the voucher. In the preferred embodiment the value of the voucher is used in the encoding algorithm, but not included in the bar coded information. This allows reasonable verification of an amount, but not regeneration of the amount. This security method allows a ticket to be validated to a higher level of confidence using information not contained in the machine readable coding.

ADVANTAGES OF THE INVENTION

The present invention provides a mobile cashier terminal (MCT) for use with a voucher gaming system and method. It enhances the advantages of applicant's voucher gaming system and method by providing local cashier player access to expedite transactions and insure better monitoring of player identification, credit exchange, payouts, and gaming verification and recording of all transactions. It is also economical and relatively cost effective to implement.

SUMMARY OF THE INVENTION

The invention comprises a mobile platform that allows a user to roam freely. The mobile platform may comprise a wheeled cart frame that has a top that is preferably waist high to provide a cashier with a ready counter top access to the cashier terminal components and cash drawer. The frame is large enough to be visible by players needing cashier services, but not too large to not be navigable between banks of gaming machines. In the preferred embodiment, the cart frame has a pair of centrally aligned large bearing wheels to support the cart, its components, and cash, and two pairs of castoring wheels aligned on the front and the back to aid in turning and positioning the cart. Removable signs may be attached to the sides of the cart for advertising and decorative purposes. The mobile cashier terminal may also include a handle attached to the frame for easier control and positioning by a cashier.

Attached to the frame is a central processing mobile terminal wherein gaming, cash, and credit transactions are entered and recorded manually or through an optical scanner. A preferred central processing mobile terminal is that produced by Javelin, model NexDisplay-4. It is mounted on top of the frame to provide easy access to the cashier. It has a fully integrated liquid crystal diode (LCD) touchscreen workstation to input data concerning cash, credit and gaming transactions into its pentium based central processing unit.

Alternatively, the input data can be entered into the central processing mobile terminal via a bar code scanner of the indicia on gaming vouchers. A preferred bar code scanner for this purpose is the combination hand-held and fixed projection scanner Model MS6720 produced by Metrologic Instruments, Inc. It has an infrared sensor and control stand for hands free projection scanning. Alternatively, it may be hand-held and transported to scan larger objects, such as the winning bar code display of a gaming device. The hardware used for the handheld device may be various commercially available devices, such as portable computer SPT 1700, available from Symbol Technologies, Inc., Holtsville, N.Y.

The central processing mobile terminal employs an on-line real time software compatible with that employed by the remote Player Account Server (PAS) central processing receiving terminal wherein all voucher, credit, and cash transactions are monitored and stored. The central processing receiving terminal checks all transactions for accuracy and maintains master records of all transactions, and is in communication with one or more cashier terminals ("CT"), and the mobile cashier terminals ("MCT") of this invention. They are connected by a radio link via an optional Point Of Sale Network Controller ("POSNC") connected to a Point of Sale Terminal ("POST"), one or more logical game controllers ("LGC"), one or more cash exchange terminals, and a plurality of player terminals ("PT"). The PAS may consist of a COMPAQ 1850R database server using the Windows NT operating system and Microsoft SQL 7.0 database software.

The mobile cash terminals have compatible software with the PAS central processing receiving terminal, and includes additional interface monitoring software which monitors the periphery equipment performance. A preferred software for this purpose is that produced by TSI Power Corporation under the tradename PowerMon II™. It not only controls and monitors the peripheral equipment, but signals AC power failure, low battery condition, or when system shutdown time has arrived. It also provides a log file for recording all power events such as power failures, low battery condition, and shutdown times.

A mobile terminal transmitter and receiver is attached to the frame and operably associated with the central processing mobile terminal for sending signals of the cash, credit, and gaming transactions entered and recorded. These mobile terminal signals are sent preferably through a wireless local area network (LAN) communications network connecting the mobile terminal to a remote central processor receiving terminal, which collects, processes, and reviews the signals sent by the mobile terminal transmitter and generates an appropriate response signal. A mobile terminal receiver is attached to the frame to collect the response signal and is operably associated with the central processing mobile terminal to translate the response signal, and generate an appropriate activation response to activate the cash drawer or printer.

A preferred mobile terminal transmitter and receiver system is that produced by Aironet Wireless Communications, Inc. Its Model US 4800/4500 UC Family provides a serial and ethernet wireless LAN adapter network link for mobile and stationary devices, such as printers, computer processors, monitoring equipment and other peripherals. Wireless transmitters and receivers are preferred in the gaming device environment for safety purposes to prevent customers from tripping over connections. The Aironet UC systems use spread spectrum radio frequency technology to extend coverage up to 350 feet in a typical office, and even further in open areas. It is available with standard serial (EIA-232-E) connectors or Ethernet (10 BaseT RJ45) connectors to provide real-time network access for all types of business applications. The Aeronet AP4800 Turbine DS Wireless Access Point model is particularly suited for wireless access to Ethernet or Token Ring network configurations, and is designed for use with direct sequence spread spectrum (DSSS) radio frequency technology. Thus the model of wireless transmitter and receivers are selected depending upon the types of computer processors employed in the network.

A cash drawer with access means is attached to the frame to enable a cashier to deposit cash or cash out player winning tickets when activated by the central processing mobile terminal. The mobile cash drawer is sized to carry sufficient cash for players expected cash needs during a gaming period, and includes slots for non-cash transaction deposits, such as customer checks, money orders, credit card sales receives, vouchers, etc. For security and tracking reasons, access to the cash drawer is generally controlled by the central processing mobile terminal via electronic signals activating a release mechanism, such as a solenoid triggered interface. In one preferred embodiment, the cash drawer is preferably slideably mounted within the cart frame in a manner to slide open when authorized to conduct a transaction. Upon completion of the transaction, the cash drawer is slid closed. A preferred cash drawer and interface is produced by MMF Cash Drawer Company. Its Model 200 provides a solenoid triggered interface which integrates with most ECR/POS Systems. It is available in either a 12 kV or 24 V solenoid cable connected trigger system, which releases the cash drawer. Additional wires may be connected to a drawer detector switch to monitor the open/closed drawer position. Other cash drawer configurations with controlled access such as a cash drawer with an openable top, and suppliers, such as Scansource are also contemplated within the scope of this invention.

A printer is attached to the frame and operably associated with the central processing mobile terminal to generate appropriate receipts, and/or vouchers issued to a player. The vouchers preferably imprinted with visual as well as bar code indicia to aid in processing and handling. This ticket printer typically employs thermal paper for this use.

To power the cart components, a portable electric power source, such as a rechargeable battery system, is employed to activate the central processing mobile terminal, transmitter, receiver, cash drawer access means, and printer. A preferred rechargeable sealed lead dioxide system 12 volt battery is that produced by Power Sonic Corporation, Model PS-12600.

Using an internal battery charger, the recharge time is approximately 33 hours using approximately 279 amps. This battery charger may be installed on the frame of each mobile cashier terminal, or be included as part of a central recharging station. A preferred battery charger is the Model C90 battery charger produced by the Good-All Company. This battery charger can operate on single or three phase current with input voltages of 120, 208, 240, 94 480 depending upon the battery. It also has a high voltage shutdown safety circuit in the event the voltage level exceeds a preset limit. It is convention cooled, and has plug-in connectors with easy access for circuit adjustment.

In addition to the rechargeable battery system, the central processing mobile terminal is preferably equipped with a separate uninterruptible power source to insure that data is not lost. A preferred back up system is that produced by TSI Power Corporation under its UPS 400B/600B uninterruptible power supplies. They have 8 hour recharge capacity, 400VA and 600 VA output, operate at universal 50/60 Hz frequency, and are network compatible. They are also rechargeable with 95 to 135 $V_{RMS}$, 47–63 Hz sinusoidal AC input.

The mobile cash terminal not only provides a convenient cash/credit terminal for players, it enables the issuance and processing of vouchers. Voucher usage is becoming more prevalent and provides issuers and players with a number of advantages such as promotional vehicles or to improve operational efficiency or regulatory compliance. The mobile cash terminal is connected to a centralized PAS receiving computer to verify the validity of these playing vouchers. Thus, fraudulent claims are minimized. It also allows a cashier to issue a player a number of different types of vouchers that may be used for gaming purposes and insures that cashiers do not payout large jackpots without centralized approval.

Mobile cashier terminals allow cashiers to maintain contact with players to issue and accept vouchers from customers on the casino floor. This provides players with more time for gaming purposes, and insures better accounting for cash intake and disbursements.

Mobile cashier terminals further provide great flexibility in play and are readily adaptable to accept and issue a wide variety of payout voucher types such as jackpot vouchers, non-cash vouchers/merchandise vouchers, no game play vouchers, competition entry vouchers, game play vouchers, restricted game play vouchers, etc. They are moved around a casino floor to accommodate customer play at player terminals without the customer having to stop play and exchange currency at a centralized fixed position cash or credit exchange terminal. In addition, the mobile cash terminal uses the same security features to encode transmissions as a directly wired PAS centralized cash terminal. In addition, the mobile cash terminal does not use a journal printer to print out all transactions. Its data is captured at the system level and is available for printout at any time.

The present invention thus provides a convenient mobile cashier terminal, which is readily adapted to provide for a players' needs to participate in different gaming activities.

BRIEF DESCRIPTION OF THE DRAWINGS

FIG. 2 is substantially a top view of the preferred embodiment shown in FIG. 1.

FIG. 3 is substantially a front view of the preferred embodiment shown in FIG. 1.

FIG. 4 is substantially a side view of the preferred embodiment shown in FIG. 1.

FIG. 5 is substantially a rear view of the preferred embodiment shown in FIG.

DESCRIPTION OF THE ILLUSTRATED EMBODIMENTS

Figure 1:
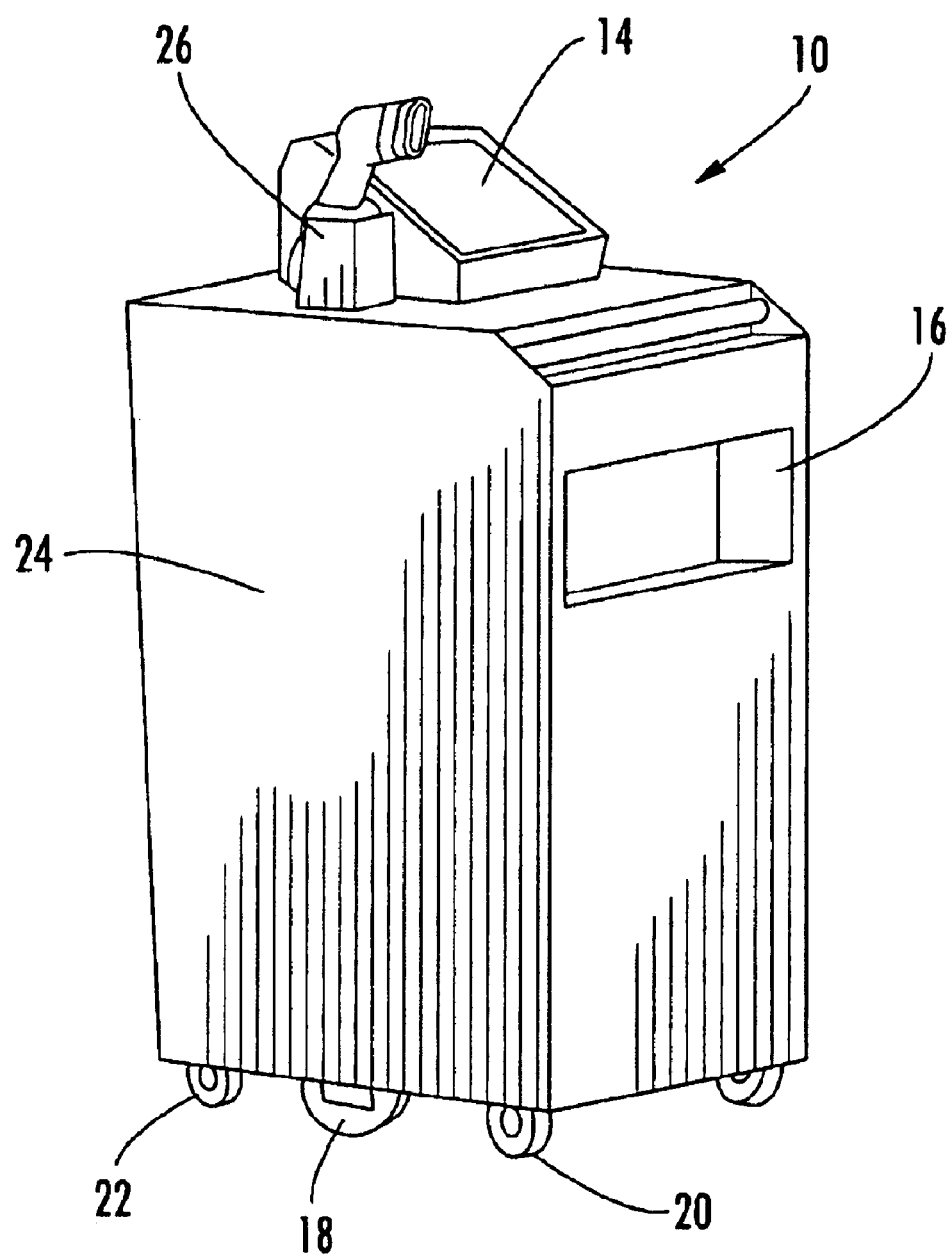
FIG. 1 is substantially a perspective view of a preferred embodiment of a mobile cashier terminal (MCT) of the invention
Figure 6:
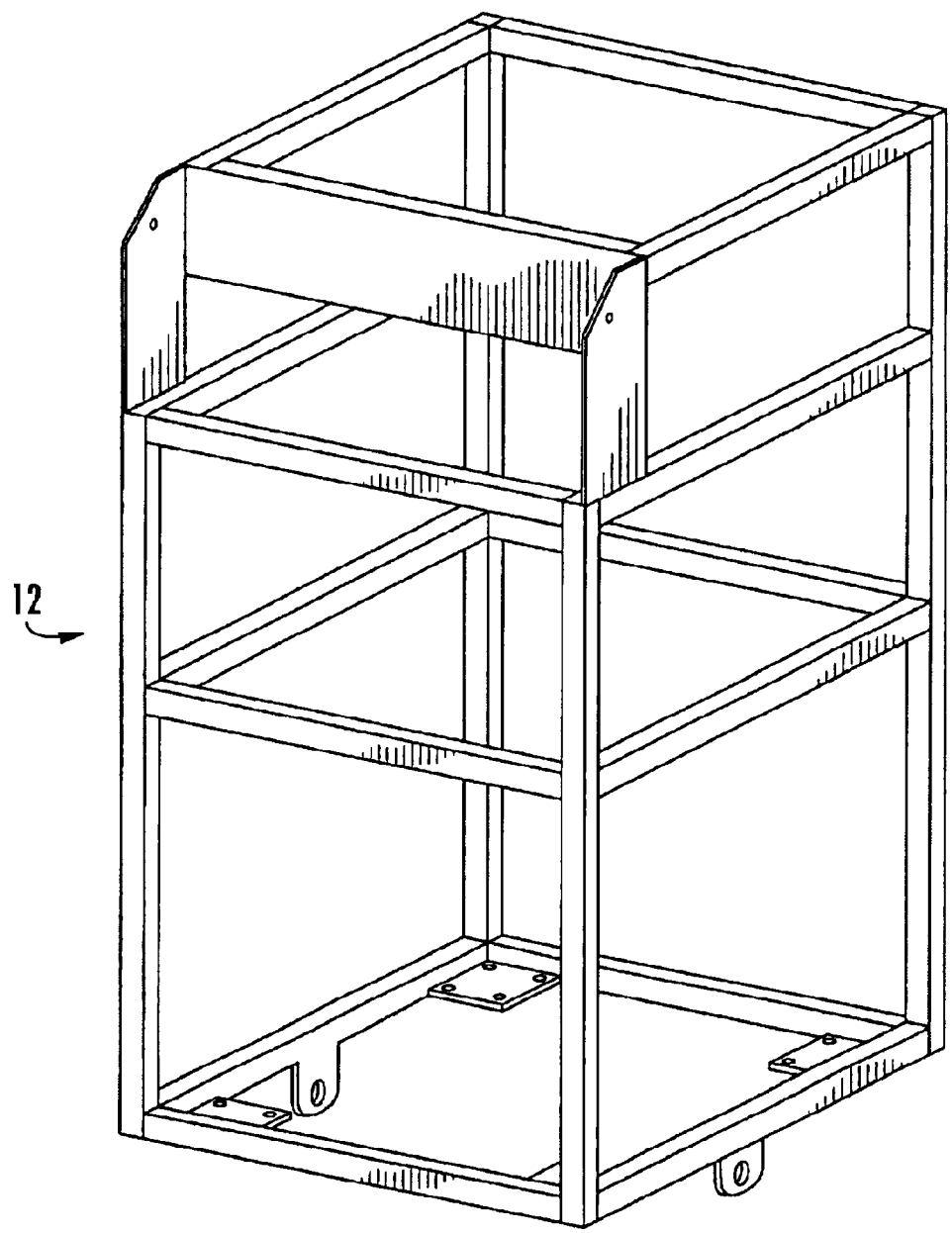
FIG. 6 is substantially a perspective view of a preferred embodiment of the internal cart frame.

FIG. 1 is a perspective view of a preferred embodiment of the mobile cash terminal 10. The top, rear, side, and front views are shown in FIGS. 2 through 5 of the preferred embodiment shown in FIG. 1. It comprises an internal support cart frame 12 shown in FIG. 6 made of tubular steel, which is of sufficient strength and dimension to support the various components. The mobile cash terminal 10 is sized with a top preferably at waist high level to provide a cashier with a ready counter top access to the cashier central processing mobile terminal 14 and cash drawer 16. The preferred embodiment is approximately 19 inches wide, 41 inches high, and two feet in depth.

Attached to the bottom of the cart frame 12 is a pair of centrally aligned large bearing wheels 18 to support the weight of the mobile cashier terminal 10 and its contents. A front pair 20 of castoring wheels and a rear pair 22 of castoring wheels are also attached to the bottom 23 of the front and the back of the cart frame 20 to aid in turning and positioning the cart. The cart frame 12 is covered with a skin 24 to which removable signs may be attached for advertising and decorative purposes. The cashier terminal may also include a handle (not shown) attached to the frame 10 for easier control and positioning by a cashier.

The central processing mobile terminal 14 allows gaming, cash, and credit transactions to be recorded by a cashier manually on its touchscreen 15. Alternatively, the input data can be entered into the central processing mobile terminal 14 via a combination hand-held and fixed projection infrared bar code scanner 26 of the indicia on gaming vouchers and tickets. A printer 27 mounted next to the terminal 14 then prints appropriate receipts or vouchers.

To access the interior of the mobile cashier terminal 10, an operator door 28 is included. This allows access to the cart interior to service the components and storage. Rechargeable batteries 30 are placed in the bottom 23 of the interior of the mobile cashier terminal 10. Above the batteries 30 is a battery recharger 32.

The central processing mobile terminal 10 employs on-line real time software described above, which is compatible with the PAS central processing receiving terminal. A mobile terminal transmitter and receiver (not shown) is attached to the frame 12 and operably associated with the central processing mobile terminal 14 for sending signals of the cash, credit, and gaming transactions entered and recorded. These mobile terminal signals are sent preferably through a wireless local area network (LAN) communications network connecting the mobile terminal to a remote central processor receiving terminal, which collects, processes, and reviews the signals sent by the mobile terminal transmitter and generates an appropriate response signal. A mobile terminal receiver (not shown) is attached to the frame to collect the response signal and is operably associated with the central processing mobile terminal to translate the response signal, and generate an appropriate activation response to the cashier.

The present invention is particularly adapted to implement the method and invention of applicant's parent application. It provides a convenient mobile cashier terminal, which is readily adapted to provide for a players' needs to participate in different gaming activities. Its particular application is outlined in the system schematic diagram of FIG. 7 showing the interconnection of the various components.

Figure 7:
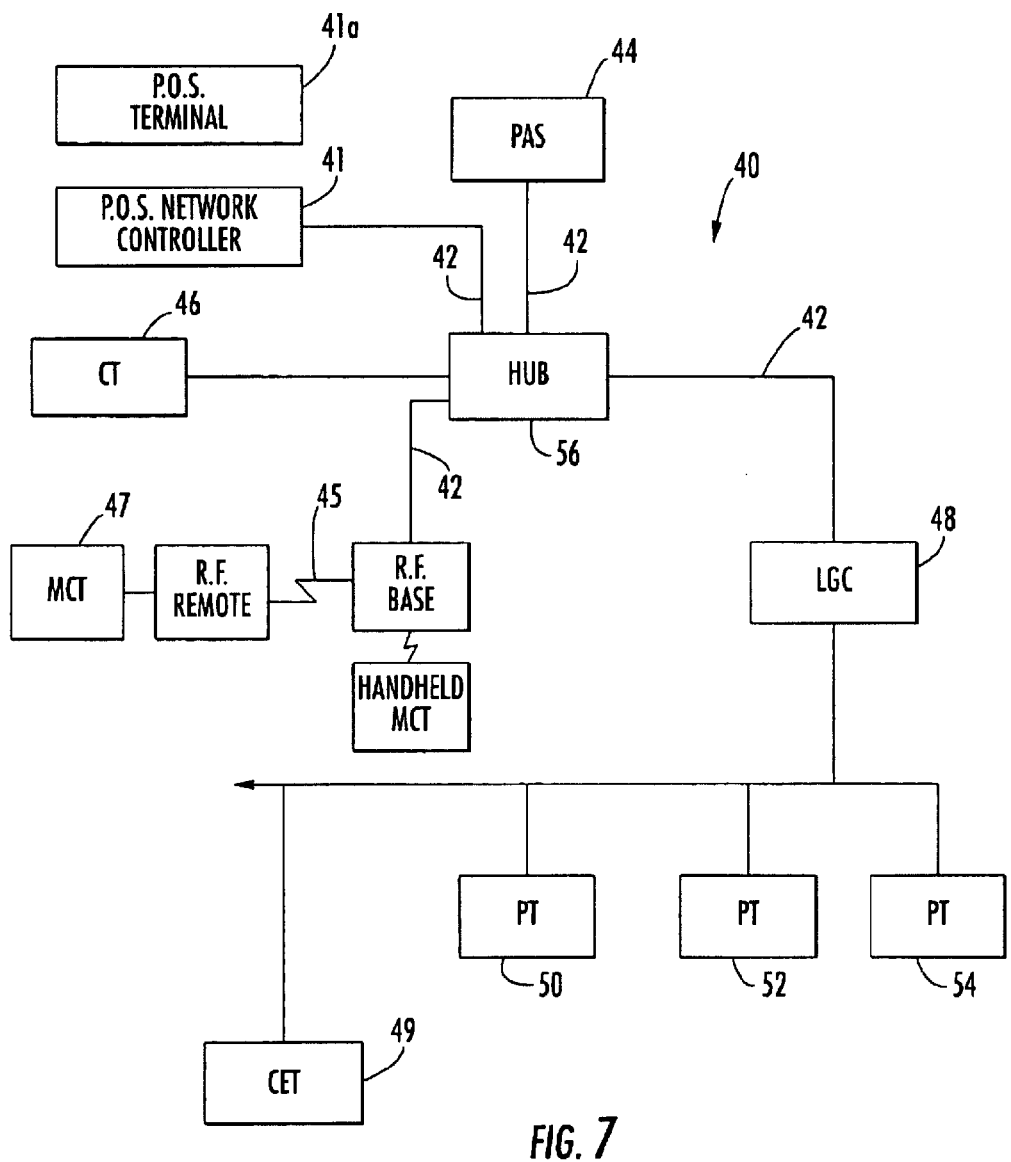
FIG. 7 is substantially a system schematic diagram showing the interconnection of the various components.

Referring now to FIG. 7, the applicant's preferred embodiment, generally 40, includes a Local Area Network (LAN) 42, which may be a conventional Ethernet LAN, interconnecting a Player Account Server ("PAS") 44, one or more cashier terminals ("CT") 46, mobile cashier terminals ("MCT") 47 connected by a radio link 45, optional Point Of Sale Network Controller ("POSNC") 41 connected to a Point of Sale Terminal ("POST") 41a, one or more game controllers ("LGC") 48, one or more cash exchange terminals 49, and a plurality of player terminals ("PT") 50, 52, 54.

The PAS may consist of a COMPAQ 1850R database server using the Windows NT operating system and Microsoft SQL 7.0 database software. The POSNC 41 and the POST 41a may consist of point of sale hardware and software components available from companies such as Micros or NCR. An Ethernet hub or switch ("HUB") 56, such as a 3COM model 3300, connects directly with the PAS 44, CT 46, MCT 47 through the radio link (Aironet) 45, and LGC 48; and in turn the LGC 48 connects the plurality of securely packaged PTs 50, 52, 54, and CET 49 into the LAN 42 in a fashion well known to those skilled in the art using Ethernet or RS-485 connection techniques.

Figure 8:
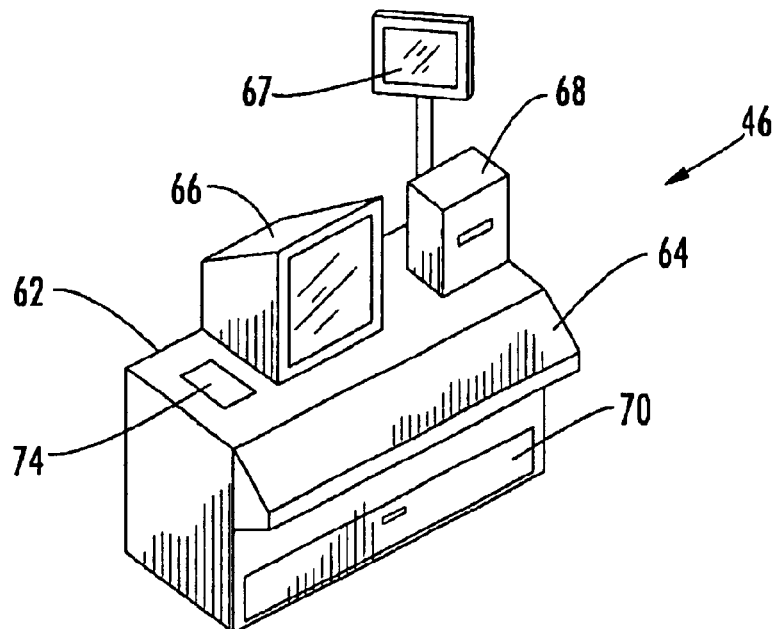
FIG. 8 is substantially a perspective view of one embodiment of a cashier terminal of the present invention.

Referring now to FIG. 8, one embodiment of the CT 46 has a central computer (not shown) 60. Mounted on the central computer 60 are conventional Ethernet input and output ports (not shown) 62, a bar code reader 26 (Metrologic model MS6720), a base video display (Miracle M0935) 66, an eye level tower display 67 (Logic Controls), a ticket printer 68 (Transact Technology, of Wallingford, Connecticut, Series 700 Thermal Printer), standard PC keyboard and RS232 controlled industry standard point of sale cash and voucher drawer 70.

Figure 10:
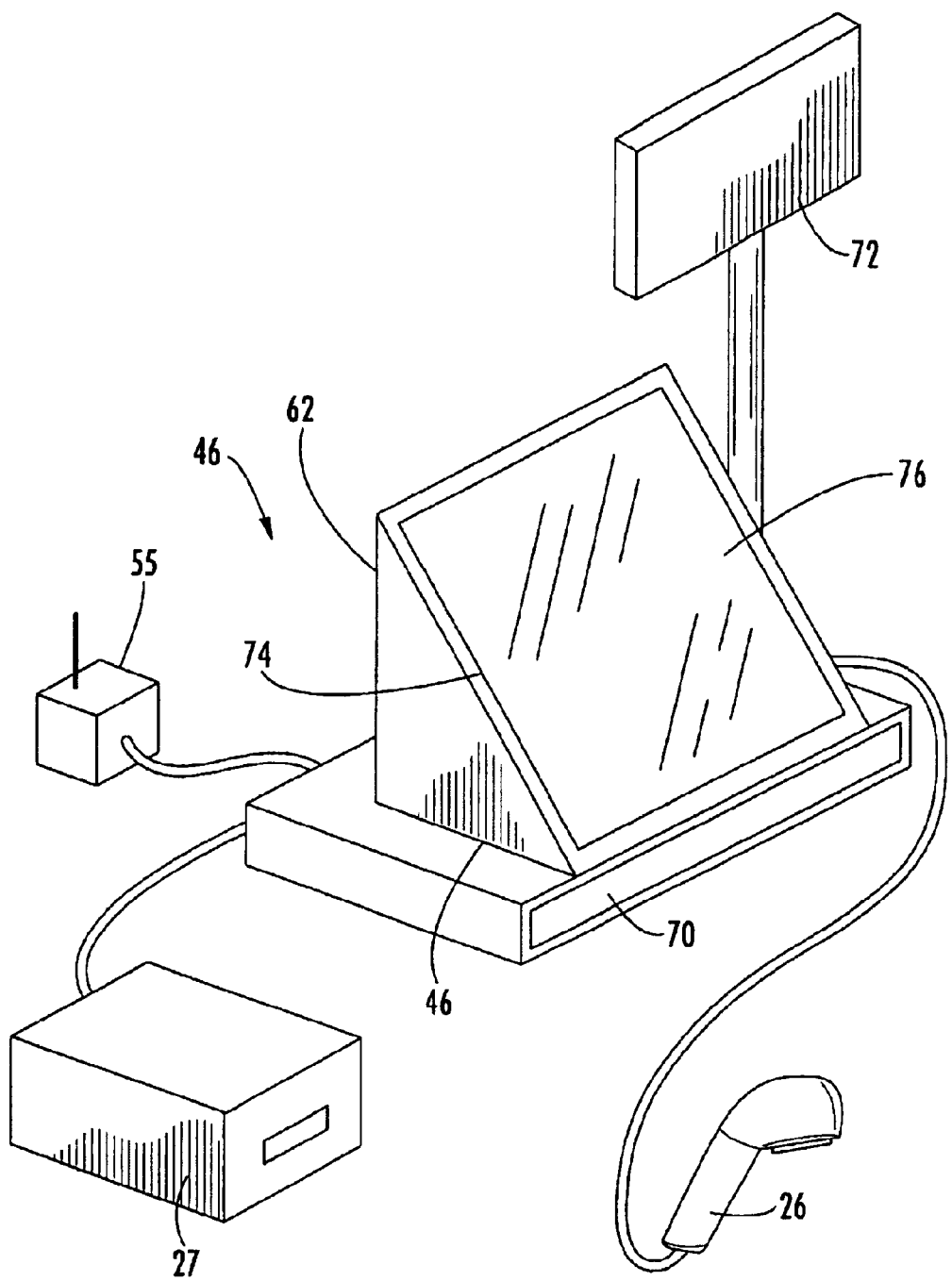
FIG. 10 is a pictorial view of a second embodiment of an alternative embodiment of a CT usable in the present system and method.

Referring now to FIG. 10, an alternative embodiment of the CT 46 (and employed on the preferred embodiment of the mobile cash terminal 10) has a central computer 46 consisting of a Javelin model JAV-LGNPW D32 WIN with integral customer display 72, video display 74 and touch screen 76. Mounted on the central computer 46 are conventional Ethernet ports (not shown) 62, optionally, for the MCT a radio transmitter/receiver (Aironet) 55, a hand held bar code reader 26 (Metrologic Model MS6720), ticket printer 27 (Transact Technology Series 700 Thermal Printer), audit printer 78 (Epsom TM-U200PD Model 119D) (not shown) and a cash and voucher drawer 70. These components are visually represented in FIG. 10.

Figure 9:
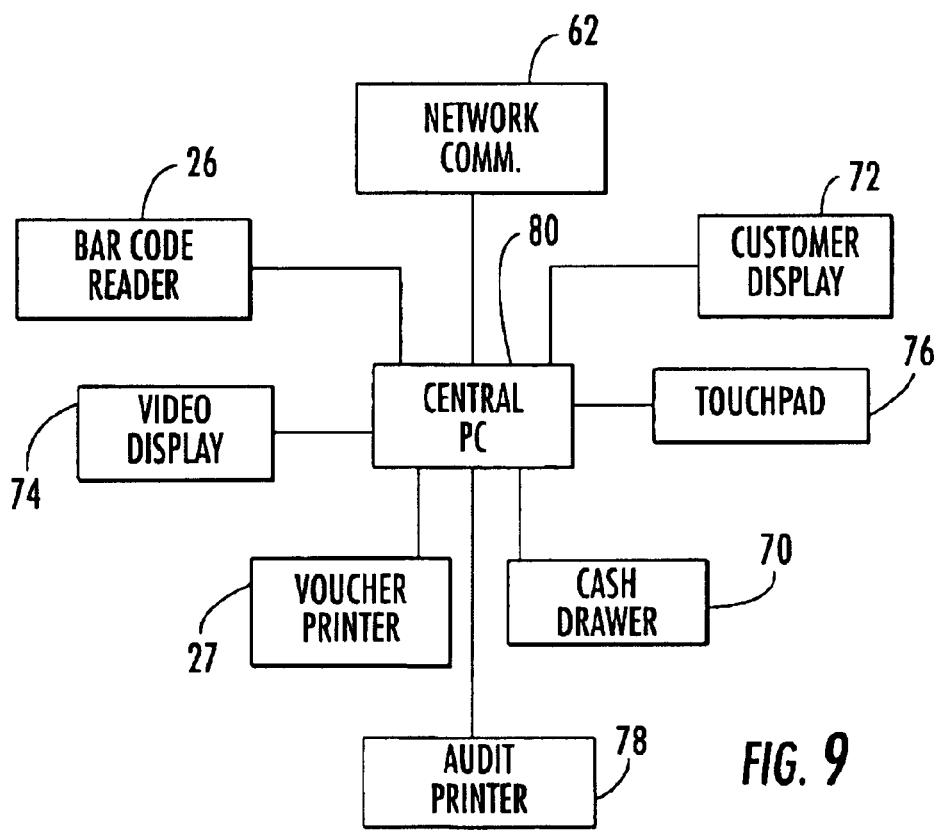
FIG. 9 is substantially a schematic drawing of the internal components of the applicant's preferred cashier terminal (CT).

As shown in FIG. 9 the CT central computer 80 for the CT 46 shown in FIG. 9 consists essentially of a PC running the Windows NT, Windows 2000, Windows 95 or 98 operating system. The central computer 80 has a standard PC motherboard 82 connected to and supporting the operation of the bar code reader 26, the table video display 74, the tower or customer display 72, an optional audit printer 78, the voucher printer 27, the touchscreen 76, the voucher drawer 70, and the network communication ports 62. The construction of the CT 46, in conformance with this specification, is well known to those skilled in the art.

Figure 11:
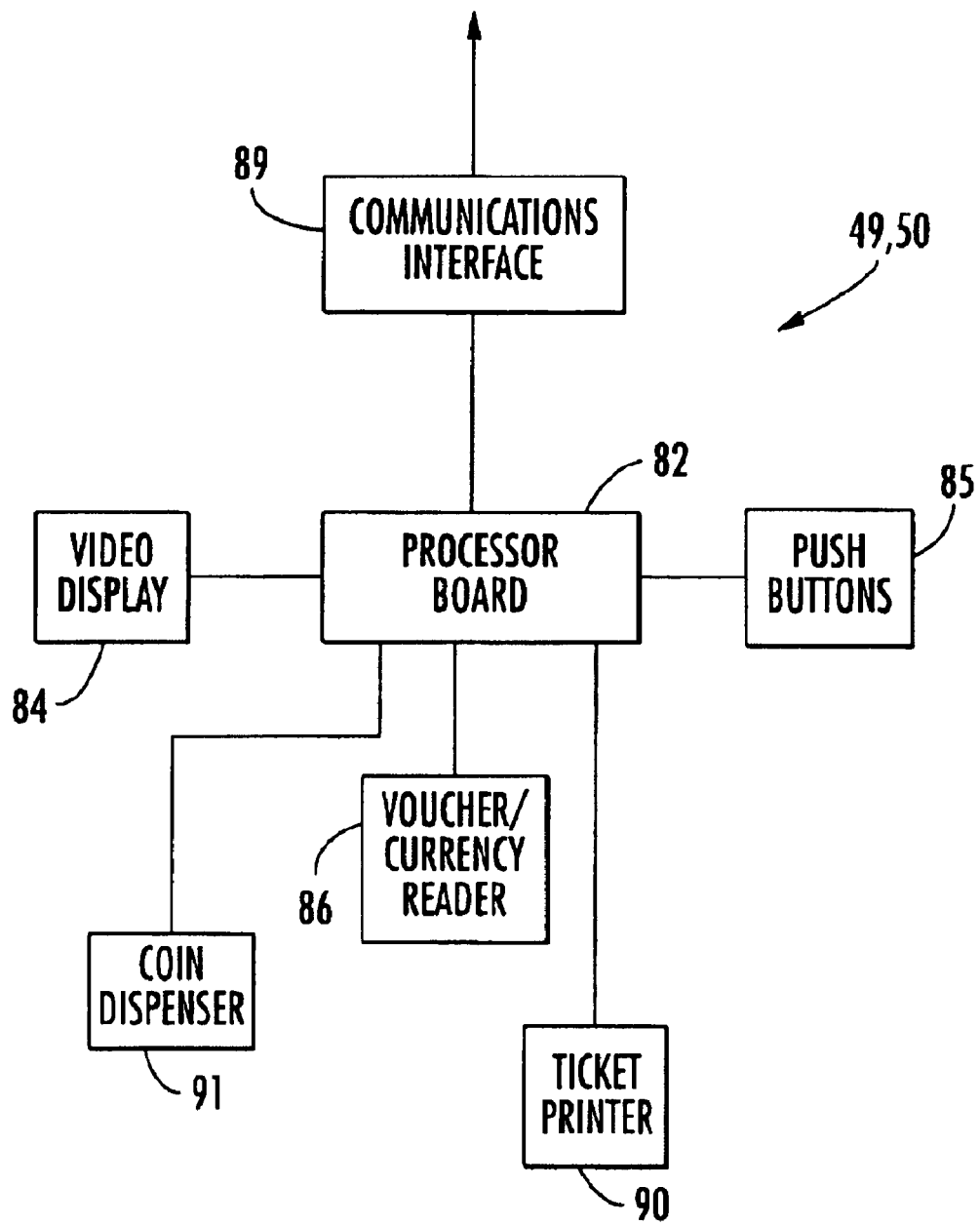
FIG. 11 is a schematic drawing of the internal components of the applicant's preferred gaming device (PT) or cash exchange terminal (CET).

With reference now to FIG. 11, the applicant's preferred player terminal PT 50 includes a central PC or equivalent motherboard 82 connected to and supporting a visual display (Telco high resolution 19 inch) 84, push or game buttons 85, a combination voucher and currency reader (JCM WBA 13SS) 86, conventional gaming network LAN input/output ports or communication interface 89, and ticket printer (Transact Technology Series 700 Thermal Printer) 90. Optionally, the PT 50 may include a coin dispenser (Asahi-Seiko, Las Vegas, Nev.) 91 in order to dispense cash awards. The construction of the PT 50 in conjunction with this specification is well known to those skilled in the art. Such gaming devices are produced by companies such as International Game Technology of Reno, Nev.

Also with reference to FIG. 11, the CET 49 is of the same general construction as the PT 50, using operating software to provide cash acceptance and voucher printing and issuance capability.

Figure 12:
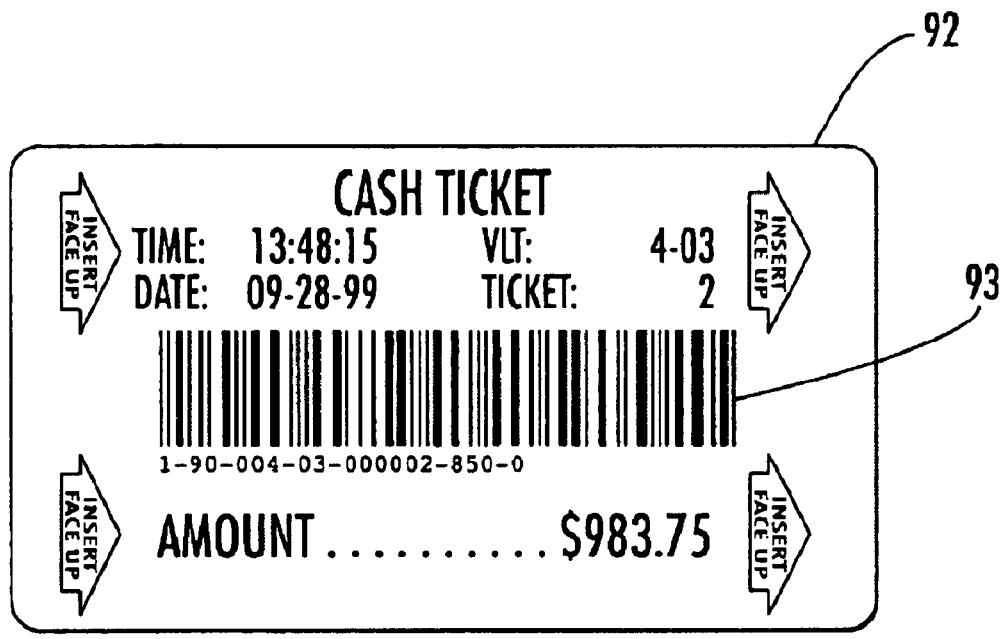
FIG. 12 is a plan view of the preferred type of voucher generated by a CT, MCT, CET or PT in the applicant's preferred system.

Referring now to FIGS. 8 and 10, the voucher printer 27 on the CT 46 prints, as shown in FIG. 12 a paper voucher 92.

Preferably, a similar type of voucher 92 can be printed by the ticket printer 27 as shown in FIGS. 8 and 10.

Preferably, the voucher 92 reports the date and time that the voucher or ticket 92 was issued. It also identifies the issuing device CT, MCT, CET or PT ("VLT") that issued the ticket, and a ticket number. The ticket 92 also states an amount or face value of the ticket 92 when issued by the CT, MCT, CET, or PT as applicable. Finally the ticket 92 also includes a bar code 93 that has a variety of fields representing the above noted data stated on the face of the ticket 92. The bar code 93 also imbeds an encoded value, which is derived as a function of the information on the ticket, including the amount. Since this field is compressed the algorithm does not allow for the reverse calculation. This value is important however for the ability it delivers to validate that a ticket is being redeemed for the correct amount, because the algorithm can be recalculated and checked. Such algorithms are well known to those skilled in the art; and the applicant believes that a wide number of such techniques may be utilized equally well. The ticket 92, thus contains information to provide for checking the authenticity of the ticket 92 as it is being used by the player in the present system. This also allows a mechanism whereby a ticket may be validated for redemption, even when access to the database is denied through network or other failure.

Figure 13:
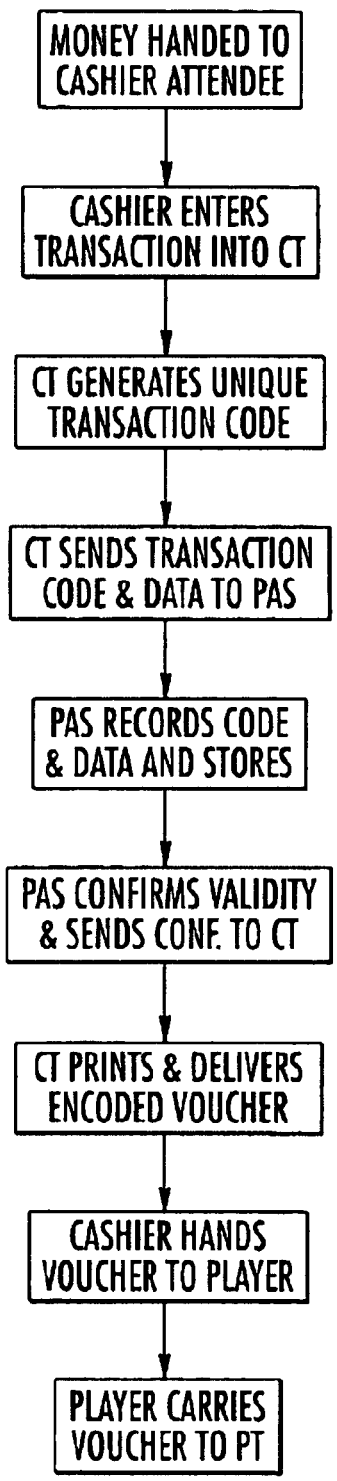
FIG. 13 is a flow chart of the applicant's preferred method of using a voucher at a CT or MCT to transfer credits from the database to a game of chance in the applicant's preferred system.

With reference now to FIG. 13, as an alternative to inserting cash directly into the PT, a player initiates play in the present system and method usually by handing cash (or other form of remuneration or credit) to a cashier attending a CT or MCT. The cashier enters the transaction into the CT or MCT through the keyboard, and the CT or MCT generates a unique transaction code to be printed on a voucher as noted above in connection with the discussion of FIG. 12. The CT or MCT then transmits the calculated transaction code and associated data (the time, date, amount tendered by the player) to the PAS. The PAS checks the validity of the information received from the CT or MCT, records the transaction code, amount of the voucher value and identifying data, and stores the information in the database. The PAS then transmits to the CT or MCT a confirmation of the validity of the code and stores all the information in a database record to be accessed by the unique transaction code. The CT or MCT prints the voucher, such as shown in FIG. 12. The cashier then hands the voucher to the player so that the player may take the voucher to commence playing games of chance on any one of the PTs on the network, as shown in FIG. 7.

Figure 14:
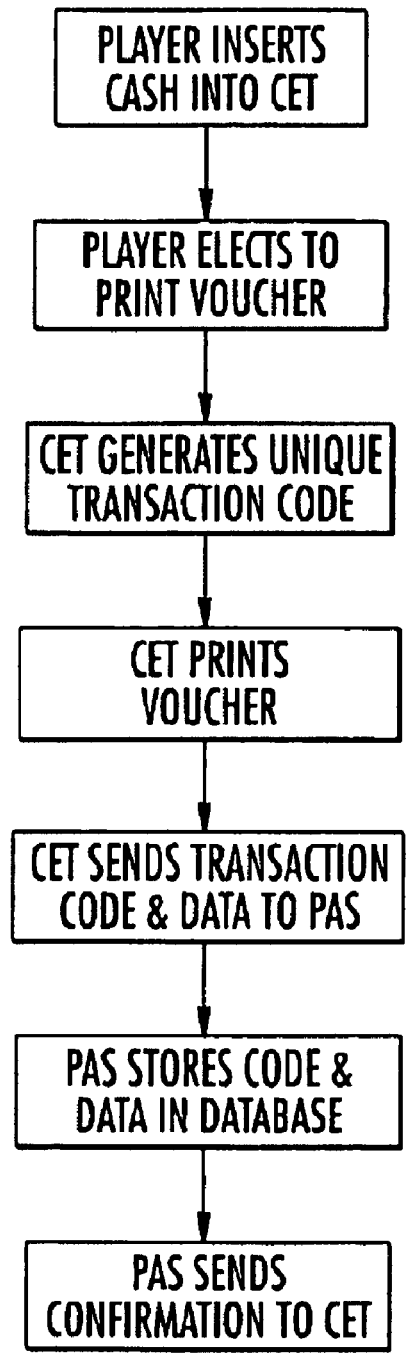
FIG. 14 is substantially a flow chart of the applicant's preferred method of using a voucher at a cash exchange terminal (CT).

With reference now to FIG. 14, a player may initiate play in the system by inserting cash into a CET 49. Multiple bills can be inserted until the player elects to print a voucher by pressing a button or touching a designated area on the CET touch screen. The CET will print a voucher of the type shown in FIG. 12. The CET will transmit to the PAS a record of the unique transaction number, the value of the voucher, the date and time of issue, and the identity of the CET. The PAS will record this information in the database and confirm the completion of the transaction to the CET. With the addition of a mode switch on a PT, a PT can be used to perform the function of a CET. That is, it can accept cash and print tickets when in CET mode, and then, when placed into a PT mode by depressing a mode button, accept vouchers, issue vouchers and conduct games of chance.

Figure 15:
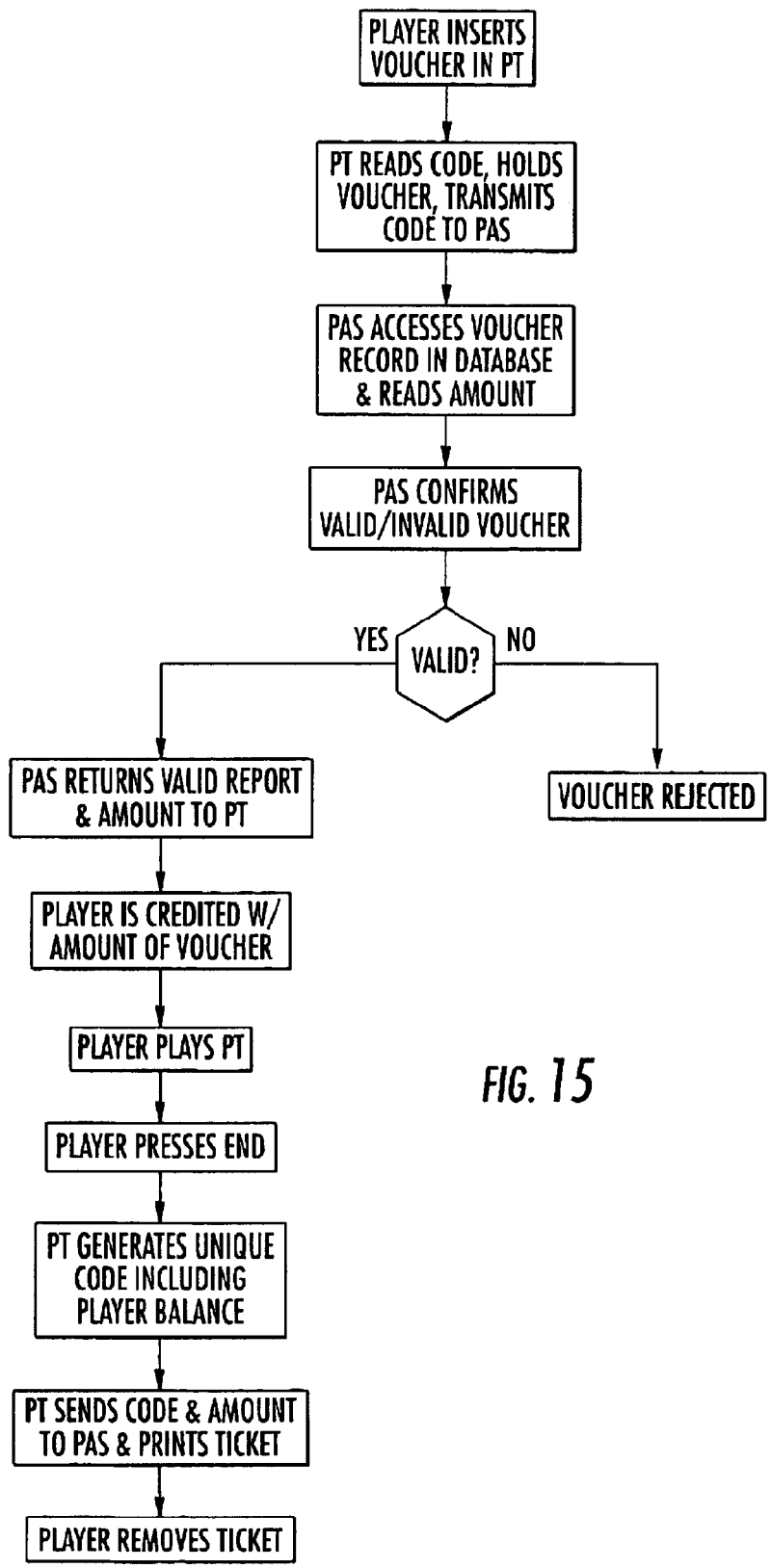
FIG. 15 is substantially a flow chart of the applicant's preferred method of using a voucher at a PT to transfer credits from the database to a game of chance in the applicant's preferred system.

Referring now to FIG. 15 a player may transfer credit from the database to a PT in order to play a game of chance on the PT. The player inserts a voucher into the voucher receptacle in the voucher/currency acceptor. The bar code is read and verified for an error free read. It is then held temporarily in an escrow position, and the bar code is sent to the processor, which forwards it to the PAS. The PAS uses the transaction code to access the database record. Using the information in the database PAS can confirm the encoded information within the bar code and thus confirm that the ticket is valid. PAS then returns the voucher amount to the PT from the database over the LAN, and then updates the status of the database record to indicate that the voucher has been paid.

If the PAS reports that the voucher is invalid, the voucher is not accepted and is backed out of the escrow position in the voucher reader assembly and returned to the player. If, on the other hand the voucher is valid, the PT stacks the voucher internally and the player is credited on the PT with the amount in the database record. The player may then use the credited amount to initiate games of chance on the PT.

Figure 16:
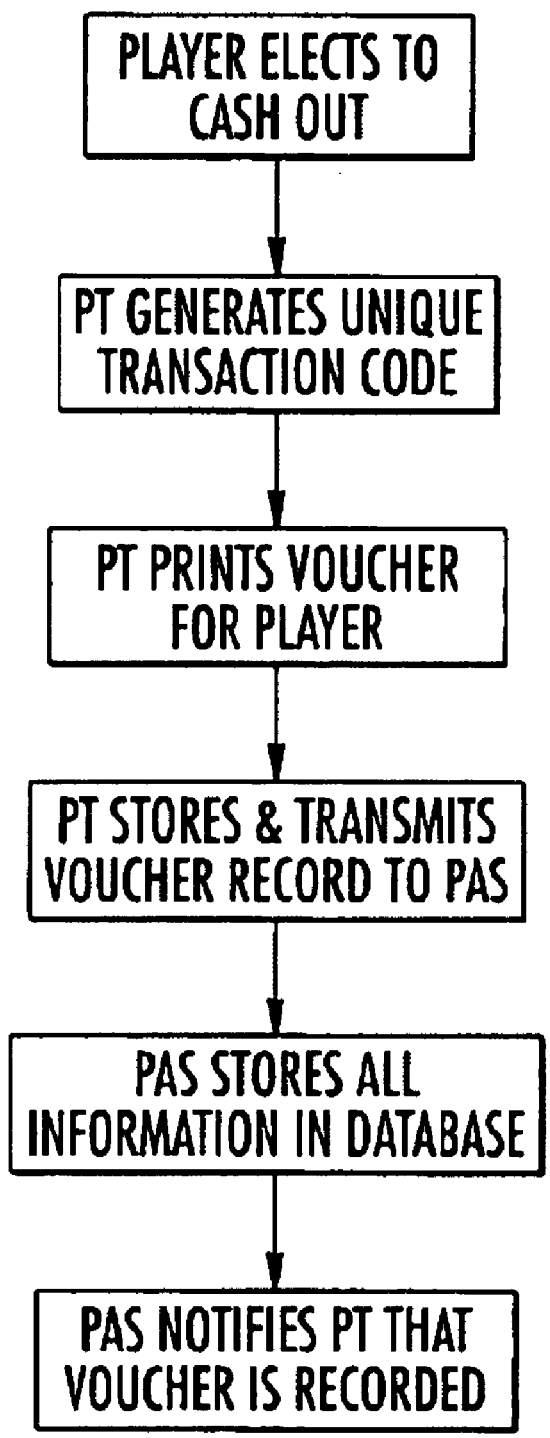
FIG. 16 is substantially a flow chart of the applicant's preferred method of using a voucher to cash out at a given gaming terminal (PT) in the preferred system and method.

With reference now to FIG. 16, when the player decides to terminate play on the PT, the player presses a button or touch screen area on the PT, which terminates play on the PT during an idle period, as is well understood by those skilled in the art. The PT then prints a new, second voucher which is delivered to the player, and this second voucher is also of the type generally shown in FIG. 12. With continuing reference to FIG. 16, this second voucher includes an associated second balance for the player, and second transaction code, based on the same type of data and encoding techniques described above for the first voucher issued to the player at the CT. The PT also reports this second code and associated data (credit balance for the player, date, time, and PT number) to the PAS, and the PAS confirms the data and updates the database record. The PAS then notifies the player's PT that the new, second voucher has been recorded in the PAS database.

Figure 17:
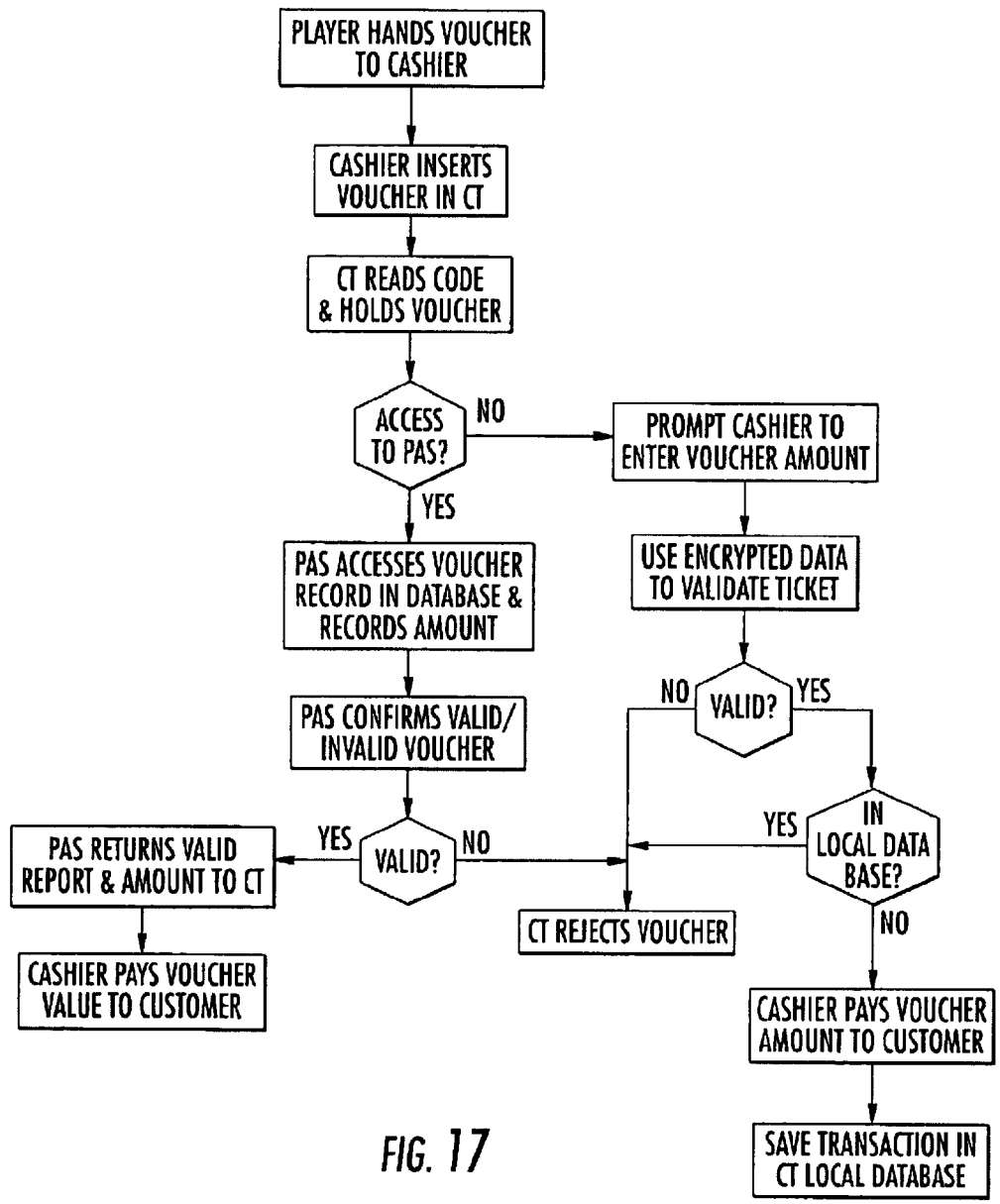
FIG. 17 is substantially a flow chart of the applicant's preferred method of turning in a voucher to a cashier at a CT or MCT for the redemption of cash or prizes in the applicant's preferred system.

With reference to FIG. 17 the player may redeem the second voucher at the CT. In doing so, the player hands the second voucher to the cashier at the CT, and the cashier scans the bar code on the second voucher with the bar code reader on the CT. The bar code reader interprets the bar code, and the CT then reads the bar code, including its encoded information and other associated data as noted above. The CT then sends this transaction code and associated data to the PAS, and the PAS checks validity of the code and data against the contents of the record for the transaction code in the database and returns a status (and value, if any) to the CT. If the PAS reports that the data is invalid, the CT rejects the voucher and reports the rejection on the CT table display. If the PAS reports that the data is valid, the CT reports the amount of the credit due the player on the CT table display, and the cashier pays the player.

Even under conditions of partial failure it is always highly desirable to be able to pay a player an amount due. Accordingly, the method allows validation, even if access to the PAS is not possible by a CT or MCT, due to network or other malfunction. In that case the CT or MCT will be capable of locally validating the payment, retaining a record of that transaction, and forwarding it to the PAS at a later time. To do this, the CT or MCT, after reading the bar code, will prompt the cashier to enter the face amount of the voucher through a manual entry. The CT or MCT will then perform two checks. It will verify that the encoded information is consistent with all data on the bar code and the amount, and it will also verify that it has not already have that ticket in its local database (indicating that it has already been cashed). If neither is true then the cashier will be prompted to pay the customer and the voucher record will be retained in the local database of the CT for later transmission to the PAS.

Figure 18:
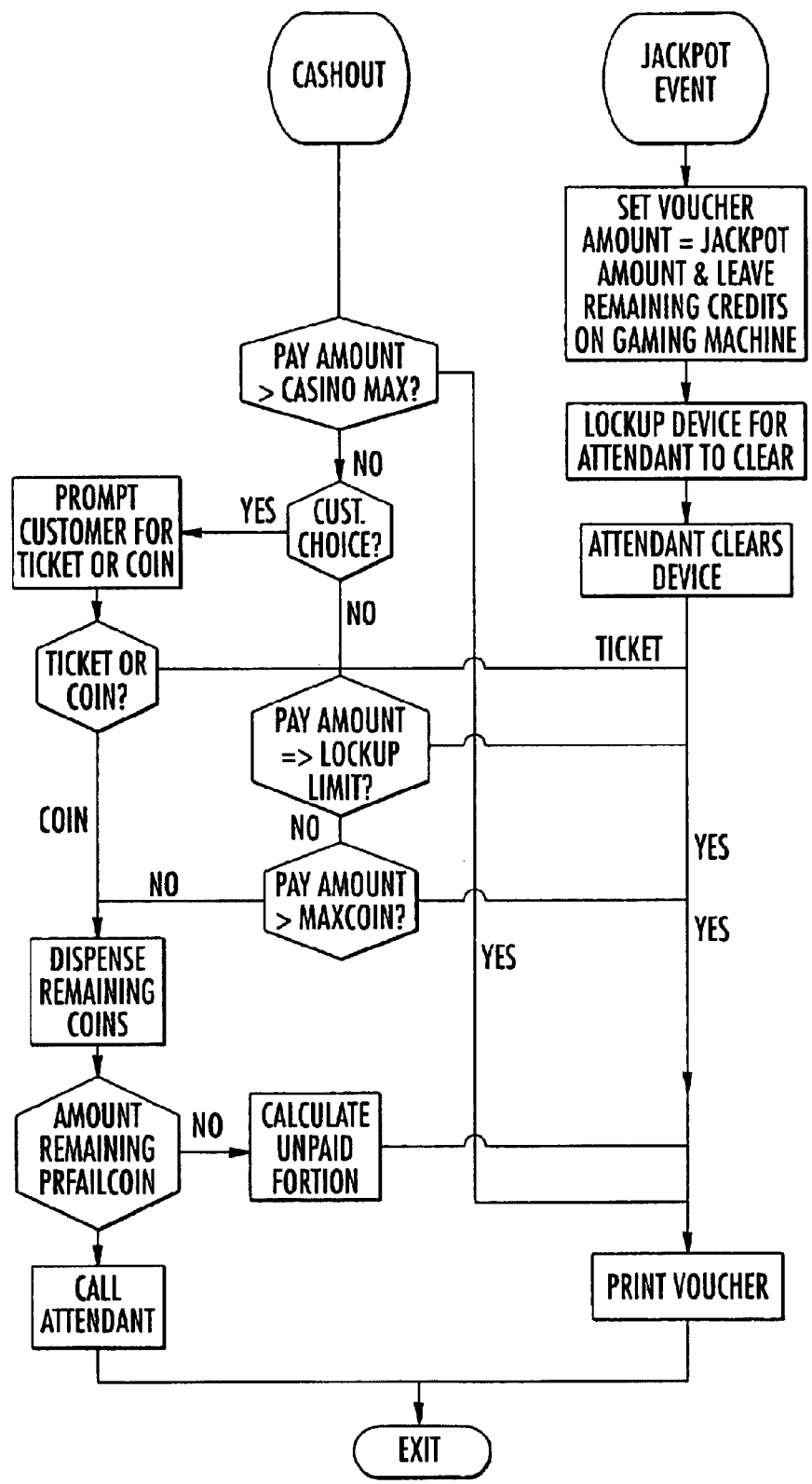
FIG. 18 is substantially a flow chart of the operation of the present invention.
Figure 19A:
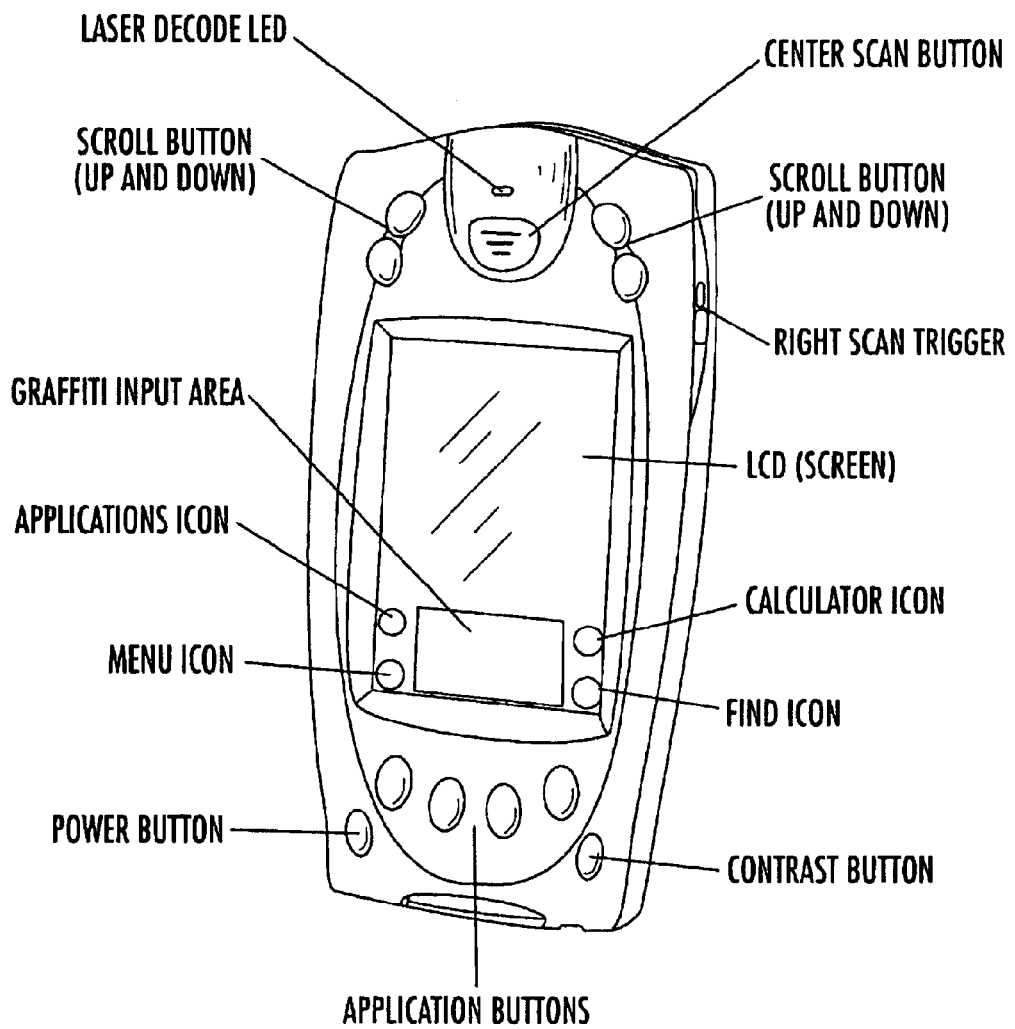
FIG. 19A is substantially a front view of a handheld MCT of the present invention.
Figure 19B:
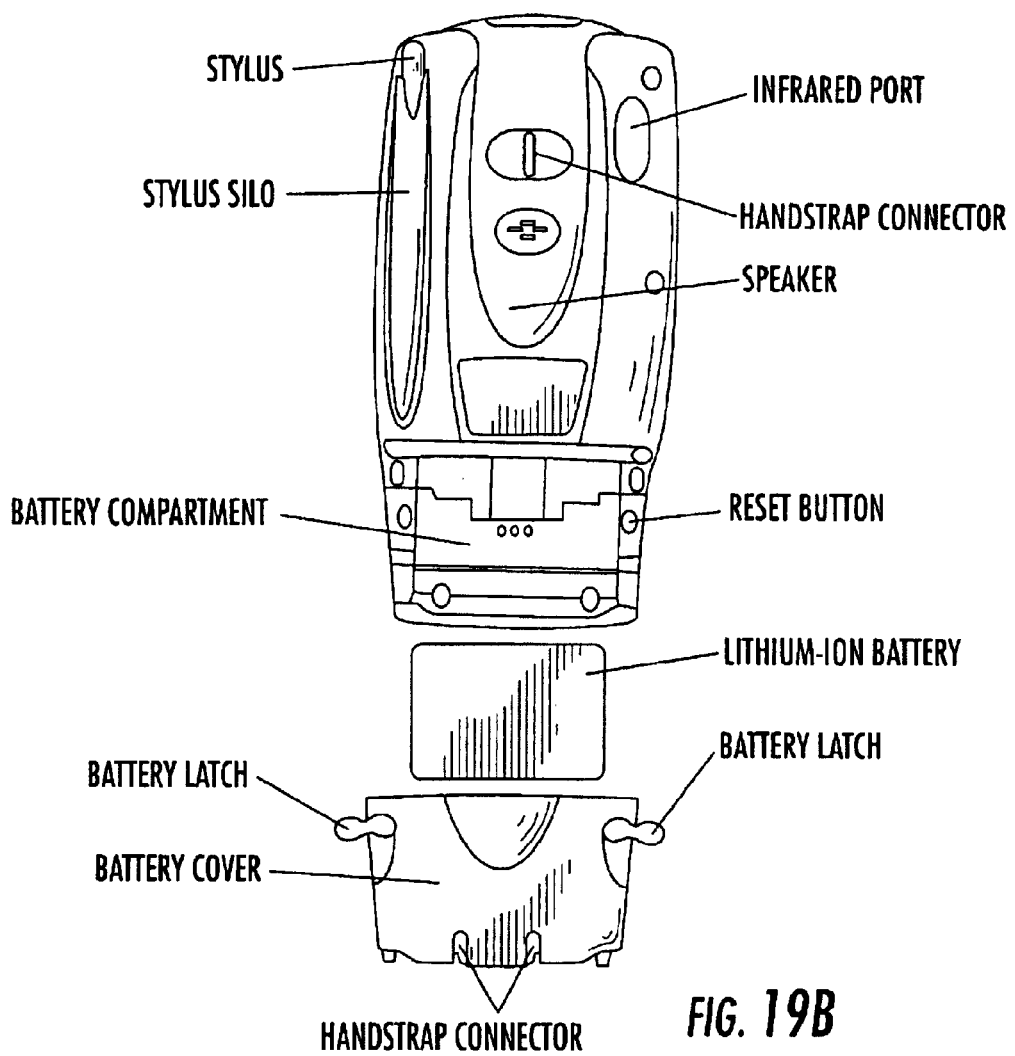
FIG. 19B is substantially a rear view of a handheld MCT of the present invention.
Figure 19C:
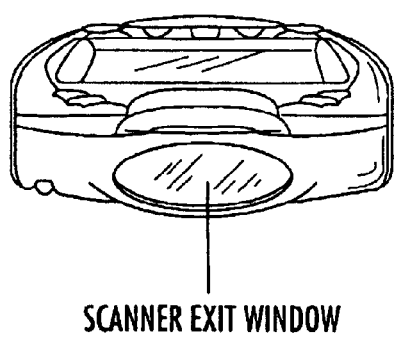
FIG. 19C is substantially a top view of a handheld MCT of the present invention.
Figure 19D:
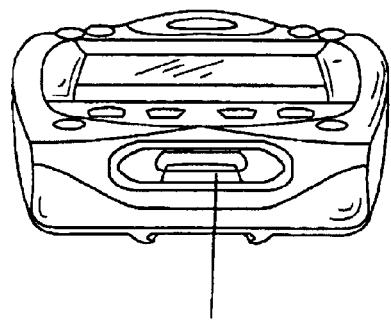
FIG. 19D is substantially a bottom view of a handheld MCT of the present invention.

Referring now to FIG. 18, the PT may alternatively be arranged to provide cash or cash redeemable awards of certain types and product or service awards based on certain predetermined or random outcomes on the PT or as a result of system generated player awards. In addition to cash and jackpot awards, this may include player awards, player bonuses, game play bonuses, or marketing promotional awards or incentives, including merchandise vouchers, entertainment vouchers, meal vouchers, vouchers for game play credits, tournament play credits, or vouchers redeemable for player club points. For example, the PT may be programmed so that it may only dispense cash up to a certain level, and for awards exceeding that level, pay all or a portion of such level-exceeding awards by issuance of an updated voucher or ticket to the player at the PT. Alternatively, or in addition, the PT may be programmed to provide awards of a service or product, rather than cash, upon the occurrence of certain outcomes at the PT. In this event, the preferred PT may report such service or product outcome on an updated voucher issued to the player. As noted above, the PT reports such outcomes and additional vouchers to the PAS, which records and stores the information reported on such additional vouchers so that the player may procure the proper award reflected in such additional vouchers from the cashier at the CT.

Alternatively, or in addition, the PT may issue special vouchers for large jackpot awards with a unique code that prevents acceptance of those vouchers through a PT and requires that the vouchers to be redeemed at a attendant based cashier terminal or mobile cashier terminal, and may require a supervisor signature and IRS form (W2G) to complete the transaction. The player terminal may be configured to print the special jackpot voucher for any single award exceeding a predetermined limit. The PT may be configured to lock up upon a large jackpot event or it alternatively may be configured to print the single award jackpot award voucher and leave the remaining credits on the PT in a continued state of game play operation, reducing PT downtime and maximizing player terminal revenue production.

Alternatively, or in addition, the PT, if adapted to provide cash or other awards directly to the player from the PT or associated dispensing structure, may be programmed to determine when the PT or other dispensing structure has failed or is unable to dispense the appropriate award to the player. The PT may, in such event, report the failure to the PAS and issue a suitable voucher or ticket to the player so that the player may then redeem the voucher for the proper award at the CT. This voucher printing mechanism thus serves as a fail safe mechanism to ensure that the player procures the proper award with minimal if any frustration. This in turn enhances the player's overall gaming experience and the likelihood that the player will continue playing the game or return to the establishment to play games of chance at a later time or date.

Alternatively or in addition, the PT may also include both a cash hopper and voucher printer and also be programmed, as shown in FIG. 19, to allow the player to elect between receipt of cash or a printed voucher reflecting the amount of an award or credit balance on the PT. The nomenclature for FIG. 19 is as follows:

PAYAMOUNT—Player or customer credits to be paid.
JPVALUE—Individual prize wins over this amount will be paid by voucher.
PRFAILCOIN—If printer fails, then pay up to this may be made by coin.
CUSTCHOICE—Provides the option to operator to allow customer to choose ticket or coin payment
LOCKUP LIMIT—Value at which machine will "lock up," requiring attendant, e.g., cashier at CT, to make prize payment to the player.
MAXCOIN—Maximum size payment that can be made in coins at the PT.

It is to be understood that the method and apparatus of the present invention may also include additional, mobile CT apparatus mounted on the LAN and connected to the PAS through the HUB shown in FIG. 7. One such mobile cashier terminal is manufactured and sold by Sierra Design Group, Reno, Nev. This mobile terminal consists of a unitary cart assembly and mounted within it: a voucher printer assembly (Transact Technology, of Wallingford, Conn, Series 700 Thermal Printer), a cash drawer with till, a spare till, a bar code scanner assembly with base (Metrologic Model MS 6720), CPU with touch-screen display (Javelin Model JAV-LGUPW D32 WIN), power supply, 12V batteries, wireless LAN module with power supply (Aimet Remote), UPS without battery but with inverter to invert the 12V DC power from the batteries into 120V AC power for the other components on the cart, six-outlet power strip, and battery charger. The mobile terminal also utilizes a radio link, such as an Airnet Base Station and Remote. When used in the present apparatus and method, the Airnet Base Station is mounted on the LAN to perform wireless communications with the Airnet Remote mounted on the mobile terminal in a fashion well known to those skilled in the art.

Accordingly, the reader will see that the mobile cashier terminal of the present invention may be used easily and efficiently adapted to provide different functions for different types of gaming play. Additional advantages may be realized by reference to the previous specification and the ensuing claims. Further, the above description and specification should not be construed as limiting the scope of the invention but as merely providing illustrations of some of the presently preferred embodiments of this invention. Thus, the scope of the invention should be determined by the appended claims and their legal equivalents rather than by the examples given.

The present invention also includes a handheld embodiment of the mobile cashier terminal. Turning to FIG. 19, handheld MCT 51 may comprise a portable computer of a type that is well known in the art. For example, handheld MCT may comprise portable computer SPT 1700, available from Symbol Technologies, Inc., Holtsville, N.Y. Handheld MCT 51 may be used to perform most of the functions of the mobile cashier terminal 10. A significant advantage of the handheld MCT is that the user may walk around the floor of a casino without pushing a cart. Peripheral equipment may also be carried by the user for performing various functions. For example, a portable printer (not shown but similar to printer 27) may be used to print vouchers and cashier's apron with compartments for holding money may be used for carrying currency. As seen in FIG. 7, the handheld MCT 51 may be in communication with system 40 through radio frequency communication device.

Handheld MCT 51 may be operated with software that is designed to implement the various functions of the device and interface the device with system 40. The microfiche appendix contains a copy of source code that may be used to implement the present invention. The source code is written in C Plus Plus and it is designed to operate on the Palm OS operating system used by the SPT 1700. The software can be complied using a standard compiler and it may be loaded on to the handheld MCT using a physical communication link, such as a cable, or a wireless interface. The appendix also contains user's manuals for operating the Handheld MCT and mobile cashier terminal 10.

We claim:

1. A mobile cashier terminal for use in a gaming system, comprising:
   a. a wheeled cart frame sized to hold gaming play and payout processing components;
   b. a central processing terminal attached to the frame wherein gaming, cash, and credit transactions are entered and recorded manually or through an optical bar code scanner;
   c. a wireless transmitter attached to the frame and operably associated with the central processing terminal to send signals of the cash, credit, and gaming transactions entered and recorded to a remote central processor receiving terminal, which collects, processes, and reviews the signals sent by the transmitter and generates an appropriate response signal;
   d. a wireless receiver attached to the frame to collect the remote central processor response signal operably associated with the central processing terminal to translate the response signal, and generate an appropriate response;
   e. a cash drawer attached to the frame to enable a cashier to open the drawer and deposit cash or cash out player winning tickets, when authorized by the central processing terminal;
   f. a printer attached to the frame and operably associated with the central processing terminal to generate receipts and vouchers issued to a player when authorized by the central processing terminal; and
   g. a portable power source to activate the central processing terminal, transmitter, receiver, cash drawer, and printer; wherein the mobile cashier terminal may be moved to any location of the player in order to perform transactions.

2. A mobile cashier terminal according to claim 1, including a handle attached to the frame to enable the mobile cashier terminal to be pushed by a cashier.

3. A mobile cashier terminal according to claim 1, wherein the portable power source is a rechargeable battery system.

4. A mobile cashier terminal according to claim 1, wherein the cash drawer is slideably mounted to the frame in a manner to slide open when authorized by the central processing terminal.

5. A mobile cashier terminal according to claim 1, wherein the wheeled cart frame includes a front pair of castoring wheels, a back pair of castoring wheels, and a centrally aligned middle pair of bearing wheels.

6. A mobile cashier terminal according to claim 1, wherein the voucher is a jackpot voucher for use in a gaming system, the jackpot voucher comprising an object, the object being adapted to store information, the jackpot voucher being issued to a player when the player wins a predefined jackpot in a game, the jackpot voucher being redeemable for a value of the jackpot.

7. A mobile cashier terminal according to claim 6, wherein the jackpot voucher may only be redeemed by a cashier.

8. A mobile cashier terminal according to claim 1, wherein the voucher is a non-cash voucher for use in a gaming system, the non-cash voucher comprising an object, the object being adapted to retrievably store identifying information, the identifying information allowing a voucher system to identify the non-cash voucher, the non-cash voucher being adapted to allow a player to redeem the non-cash voucher for goods or services.

9. A mobile cashier terminal according to claim 1, wherein the voucher is a no game play voucher for use in a gaming system, the no game play voucher comprising an object, the object being adapted to retrievably store identifying information, the no-game play voucher being issued to a player when the player pays an amount of money in a voucher system and the no game play voucher is issued representing the value of the money without the player playing.

10. A mobile cashier terminal according to claim 1, wherein the voucher is a competition entry voucher for use in a gaming system, the competition entry voucher comprising an object, the object being adapted to retrievably store identifying information, the competition entry voucher being issued to a player when the player pays an amount of money in a voucher system, and the competition entry voucher is issued representing an entry in a contest or drawing.

11. A mobile cashier terminal according to claim 1, wherein the voucher is a restricted game play voucher for use in a gaming system, the restricted game play voucher comprising an object, the object being adapted to retrievably store identifying information, the restricted game play voucher being issued to a player when the player pays an amount of money in a voucher system, and the restricted game play voucher is issued representing a valid amount that must be used to play in restricted gaming devices.

12. A mobile cashier terminal according to claim 11, wherein the restricted game play voucher may not be cashed out, and winnings as a result of play would be cashable.

13. A mobile cashier terminal according to claim 1 wherein the vouchers are adapted for use with a gaming network associated with gaming devices with randomly generated outcomes of a fixed percentage payout, the gaming network having:
   a. a database which stores information on each voucher issued,
   b. gaming devices which have reading devices to read vouchers and printers to generate vouchers,
   c. mobile cashier terminals where cashiers can accept vouchers from customers and exchange them for cash, or the mobile cashier terminal itself accepts cash from customers and exchanges it for vouchers,
   d. automated redemption stations, where customers can insert vouchers and have them exchanged for cash and or insert cash and have vouchers issued,
   e. a communications network for interfacing at least two of the group consisting of the database, the gaming devices, the cashier terminals and the automated redemption stations;
   f. gaming device activation means to initiate the gaming device in response to cash, vouchers, credit cards, or other form of remuneration; and
   g. a payout voucher generated by the gaming device having:
      1. machine readable indicia of a type and amount of payout owed a player,
      2. accounting data showing when, and where the voucher is to be paid, and
      3. visual indicia showing the type and amount of payout owed a player.

14. A mobile cashier terminal according to claim 13, including a first play access voucher to initiate the gaming device, having:
   1. machine readable indicia of a game objective and an authorized level of play allowed to be played, 2. accounting data showing when and where the voucher was purchased,
3. visual indicia showing the game objective and the authorized level of play allowed to be played.

15. A gaming voucher method incorporating mobile cashier terminals adapted for use with gaming devices with randomly generated outcomes of a fixed percentage payout comprising:
   a. providing a database which stores information on each voucher issued in a remote central receiving and processing terminal wherein gaming, cash, and credit transactions are entered and recorded manually or through an optical bar code scanner,
   b. providing mobile cashier terminals where cashiers can accept vouchers from customers in exchange for cash or credit upon approval by a remote central processor, or accept cash from customers and exchange it for vouchers, or where customers can redeem winning vouchers; wherein the mobile cashier terminals may be moved to any location of the customer in order to perform transactions,
   c. providing a wireless mobile cashier terminal transmitters and receivers operably associated with the remote central receiving and processing terminal to send signals of the cash, credit, and gaming transactions entered and recorded to the remote central processor receiving terminal, which collects, processes, and reviews the signals sent by the mobile cashier terminal transmitter and generates an appropriate response signal,
   d. providing gaming devices which have reading devices to read vouchers and printers to generate vouchers, and initiating the gaming device upon receipt of funds from a player; and
   e. employing a payout voucher generated by the gaming device having:
      1. machine readable indicia of a type and amount of payout owed a player,
      2. accounting data showing when, and where the voucher is to be paid, and
      3. visual indicia showing the type and amount of payout owed a player.

16. A gaming voucher method according to claim 15, including initiating the gaming device with a first play access voucher, having:
   1. machine readable indicia of a game objective and an authorized level of play allowed to be played,
   2. accounting data showing when and where the voucher was purchased,
   3. visual indicia showing the game objective and the authorized level of play allowed to be played.

17. A gaming system including mobile cash terminals useable in a casino so that a player may play a game of chance to try to win an award, the gaming system comprising in combination:
   A. a computer network;
   B. a database server connected to the computer network;
   C. at least one mobile cash terminal connected to the computer network, the mobile cash terminal including a voucher printer that, upon receipt of cash or other remuneration at the mobile cash terminal: (i) prints vouchers with a unique transaction code on a voucher; and (ii) provides information, including at least the unique transaction code, to the database server; wherein the mobile cash terminal may be moved to any location of the player in order to perform transactions;
   D. a plurality of player terminals connected to the computer network, each such player terminal including a game of chance interface, a voucher receptacle, a ticket printer that may print a ticket upon an occurrence of certain outcomes in the game of chance interface, and a communication interface that provides information, including at least the unique transaction code, to the database server upon receipt of the voucher in the receptacle and upon an occurrence of certain outcomes in the game of chance or an event at the player terminal;
   so that the database server may confirm validity of the information received at the database server, update the database maintained at the database server, and provide updated information to the player terminal or mobile cash terminal in connection with the voucher.

18. The gaming system of claim 17 wherein the player terminal and voucher receptacle are cooperatively adapted to have the voucher receptacle reject the voucher when the database server does not confirm validity of the voucher.

19. The gaming system of claim 17 wherein, upon the occurrence of a predetermined award type, the player terminal generates a unique award code and the ticket printer prints the unique award code on a ticket and dispenses the ticket, whereby the player may take the dispensed ticket and exchange the ticket for the award type.

* * * * *